United States Patent

Costanza et al.

[15] 3,659,934
[45] May 2, 1972

[54] SLIDE TRANSPORT DEVICE

[72] Inventors: Carl C. Costanza, Chicago; Walter W. Weber, Des Plaines; Frank W. Betlejewski, Chicago; Richard Frystak, Park Ridge, all of Ill.

[73] Assignee: Bell & Howell Company, Chicago, Ill.

[22] Filed: Sept. 23, 1969

[21] Appl. No.: 860,384

[52] U.S. Cl. ..................... 353/103, 353/113, 353/21
[51] Int. Cl. ........................ G03b 23/00, G03b 23/02
[58] Field of Search ............................. 353/103–117

[56] References Cited

UNITED STATES PATENTS 2,364,627  12/1944  Fassin ........................... 353/110
2,521,709  9/1950   French .......................... 88/28
3,123,925  3/1964   Johnson ......................... 40/79

FOREIGN PATENTS OR APPLICATIONS 747,066   1/1944   Germany ....................... 353/117
24,560   12/1896   England ........................ 353/113

Primary Examiner—Leonard Forman
Assistant Examiner—A. J. Mirabito
Attorney—William F. Pinsak

[57] ABSTRACT

A device for transporting slides in a horizontal plane to be projected by a slide projector.

4 Claims, 9 Drawing Figures

Patented May 2, 1972

Inventors
Carl C. Costanza,
Walter W. Weber,
Frank W. Bellejewski,
Richard Frystak.

By William F. Pinsak Atty

Patented May 2, 1972

Inventors:
Carl C. Costanza,
Walter W. Weber,
Frank W. Betlejewski,
Richard Frystak.
By William F. Pinsak Atty.

Patented May 2, 1972  3,659,934

Inventors:
Carl C. Costanza,
Walter W. Weber,
Frank W. Bellejewski,
Richard Fryslak.
By William F. Pinsak Atty

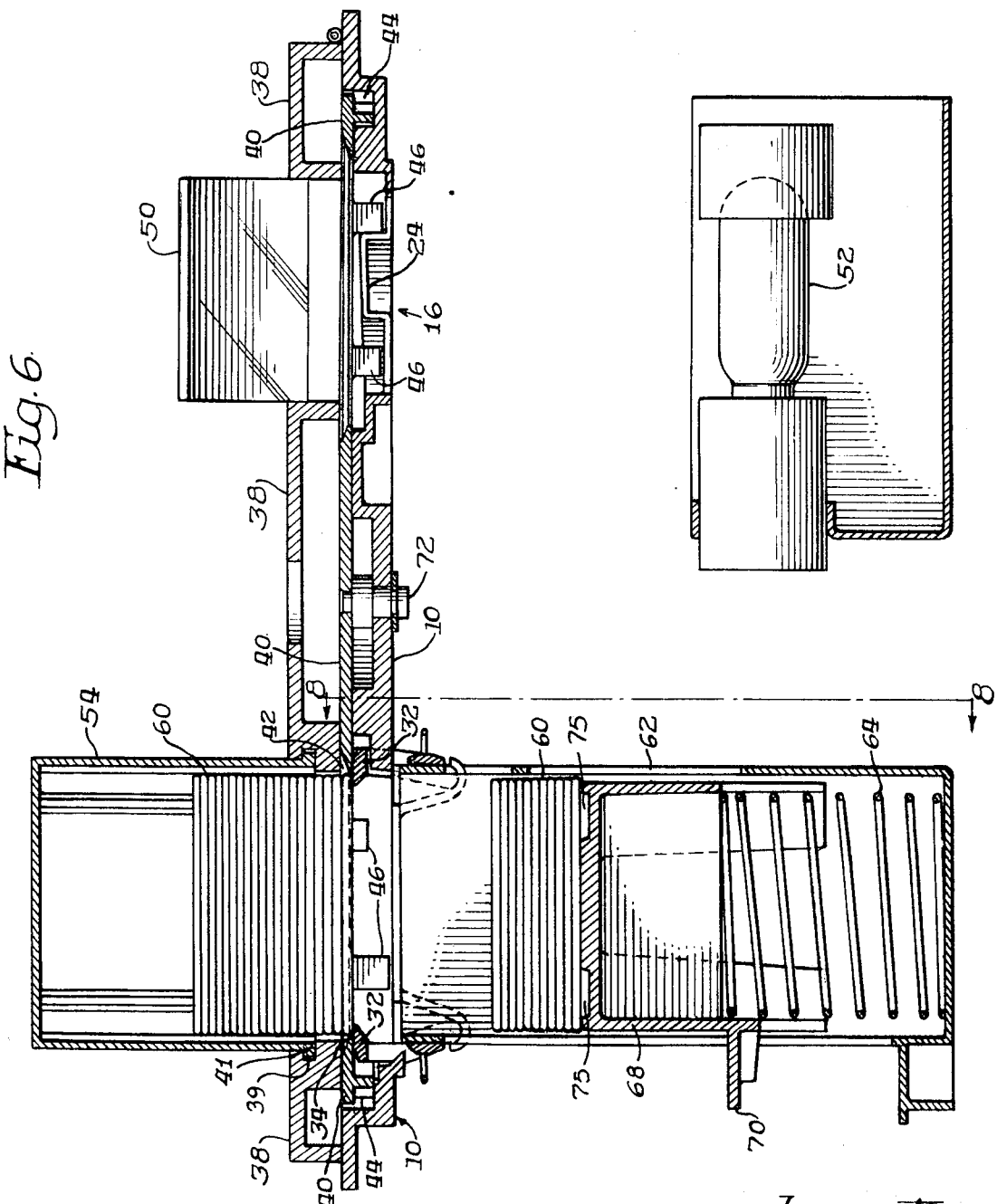

3,659,934

SLIDE TRANSPORT DEVICE

CROSS-REFERENCE TO RELATED APPLICATIONS

This application relates to the inventions in co-pending application Ser. Nos. 735,730, filed June 10, 1968 now U.S. Pat. No. 3,591,275, 860,336, filed Sept. 19, 1969; 860,385, filed Sept. 19, 1969 now U.S. Pat. No. 3,606,528; 860,856, filed Sept. 19, 1969; 860,857, filed Sept. 19, 1969; 860,858, filed Sept. 19, 1969.

BACKGROUND OF THE INVENTION

This invention relates generally to the field of slide projectors. More specifically, it relates to slide handling apparatus finding particular utility in the slide projector described in co-pending application Ser. No. 735,730, filed June 10, 1968.

That projector overcomes many prior art problems by presenting slides to projection apparatus in a horizontal plane. Horizontal orientation provides a convenient means for effecting pre-viewing of a slide before actual projection. The complexity of the requisite apparatus is materially reduced and great increases in reliability manifest themselves. However, the development of novel slide transport apparatus was needed to utilize the horizontal presentation approach. This invention responds to that need and encompasses a slide transport system that simply, economically and with a high degree of reliability presents a continuous supply of slides in a horizontal plane to operative stations of a slide projector.

The ability to reverse the normal projection sequence so a previously viewed slide may be re-projected without completely re-cycling a given supply of slides, obviously adds a large measure of utility to a slide projector. Inadvertent cycling, a forgotten thought, or re-projection for closer examination, among many others, provide reasons for wishing to reverse the normal sequencing of a slide supply. Horizontal projection demanded a novel transport system to accomplish the above task and this invention responds to that demand.

Additionally this invention comprehends apparatus that allows the same operative station on the projector to be used for slide entry into and exit from the projector. While facilitating the reverse mode of operation of the projector, this feature also minimizes the space requirements and esthetic considerations are concurrently enhanced.

Also a part of the entry-exit station apparatus is a novel mechanism for releasing an element from holding means. This feature enhances the removal of a projected series of slides from the slide projector to allow insertion of a second supply.

SUMMARY OF THE INVENTION

This invention has been developed to transport slides through four operative stations: entry, pre-viewing, projection, post-projection and finally returning to the entry station which serves as an exit station after the foregoing path has been traversed, thus its characterization previously as an entry-exit station. However, as will become more apparent herein there could be fewer or more operative stations if so desired. A platen with apertures corresponding to the above operative stations is provided. Only the aperture at the entry-exit station need be large enough to allow the passage of a slide. Horizontal transport surfaces at two levels are formed on the platen with an inclined plane portion communicating the two levels. A drive plate with four slide receiving apertures provides the motive power for moving the slides along the transport surfaces in a generally circular fashion.

The upper transport level provides transport surfaces for a slide resting thereon as the slide moves after entering the projector at the entry-exit station to the pre-viewing station and then to the projection station. Leaving the projection station the slide travels down a ramp or inclined plane to the lower level transport surface prior to positioning at the post-projection station. Continuing on the lower level the slide again reaches the entry-exit station, being located on the lower level the slide exits from the projection apparatus through the exit aperture.

A pair of spring biased arms overlying the exit aperture prevent a slide placed thereon when entering the projector from dropping through the aperture. The arms are so constructed that the slide passes under them when on the lower transport level and may then exit from the projection apparatus through that aperture. A plate-like upper surface overlying the path from the post-projection station to the arms at the entry-exit station provides a transport surface for a new slide resting on the arms when the normal sequence of operation reversed. Thereby the new slide will not fall to the lower surface during the reverse mode of operation, which prevents its exit during the next normal cycle.

Via slots in a housing overlying the projector, a supply cartridge of slides is slid horizontally into position over the spring urged arms. Underlying the exit aperture a vertical receiving chamber with a platform slideably located therein provides apparatus for collecting the viewed slides. After the slide supply is exhausted and slides are contained within the chamber, merely lifting the platform pushes the slides between and through the spring urged arms into the supply cartridge. Detent means hold the platform in its upper position where it remains until the slide supply cartridge is slid far enough so the platform no longer supports the slides. Inclined plane grooves formed in the upper surface of the platform cooperate with a like number of tabs, any number will suffice, extending downwardly from the supply cartridge. As the tabs are slid within the grooves ultimately a point is reached where the force applied by the tabs to the platform is sufficient to force it out of engagement with the detents whereupon it drops down into the receiving chamber.

BRIEF DESCRIPTION OF THE DRAWINGS

The features of the invention will become more apparent in the following detailed description and drawings wherein:

FIG. 6 is a cross-sectional view taken along line 6—6 in FIG. 1 of the projector more fully assembled than in FIG. 1.

Referring to FIG. 2 there is seen the platen 10 of the apparatus. Four apertures 12, 14, 16, 18 are cut in the platen, and correspond to the operative stations of the slide projector: entry-exit, pre-viewing, projection, and post-projection respectively. A retaining means 28, more detailed in FIG. 5, is positioned above the exit aperture 12, to prevent a supply of slides placed on its upper surfaces 34 from dropping through the exit aperture 12.

Figure 1:
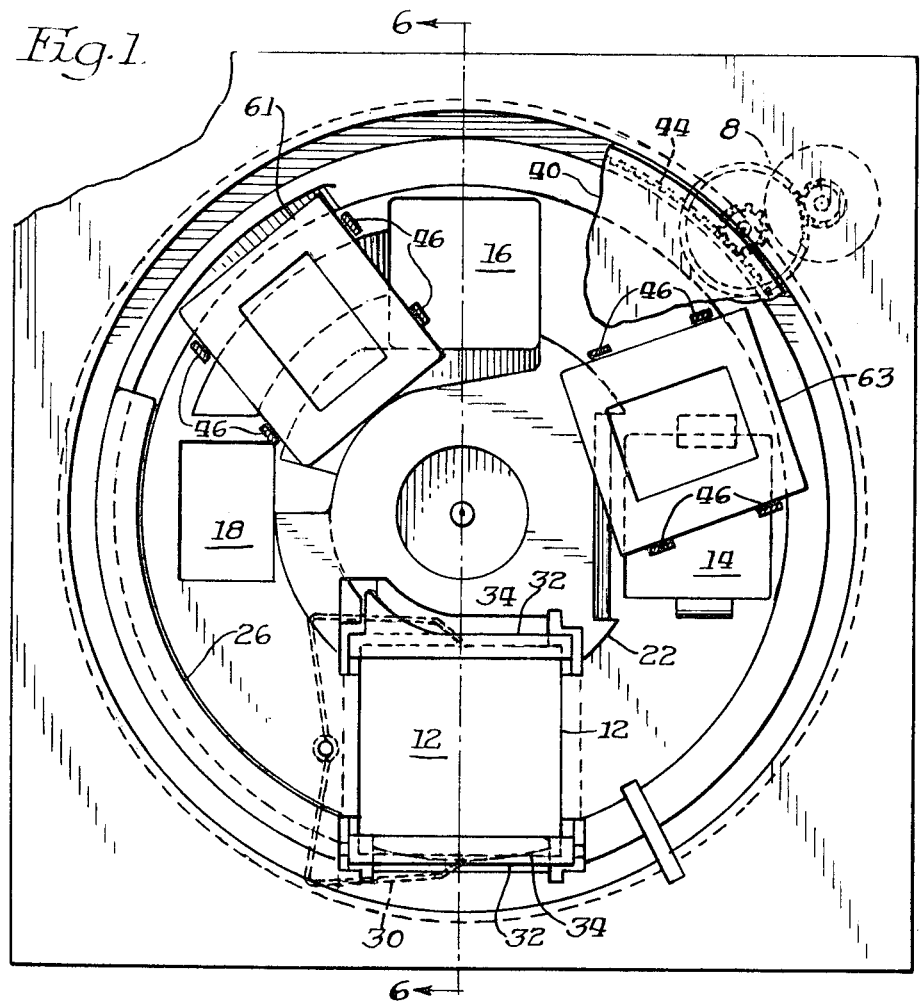
FIG. 1 is a top view of the transport apparatus and showing two slides in position thereon.
Figure 2:
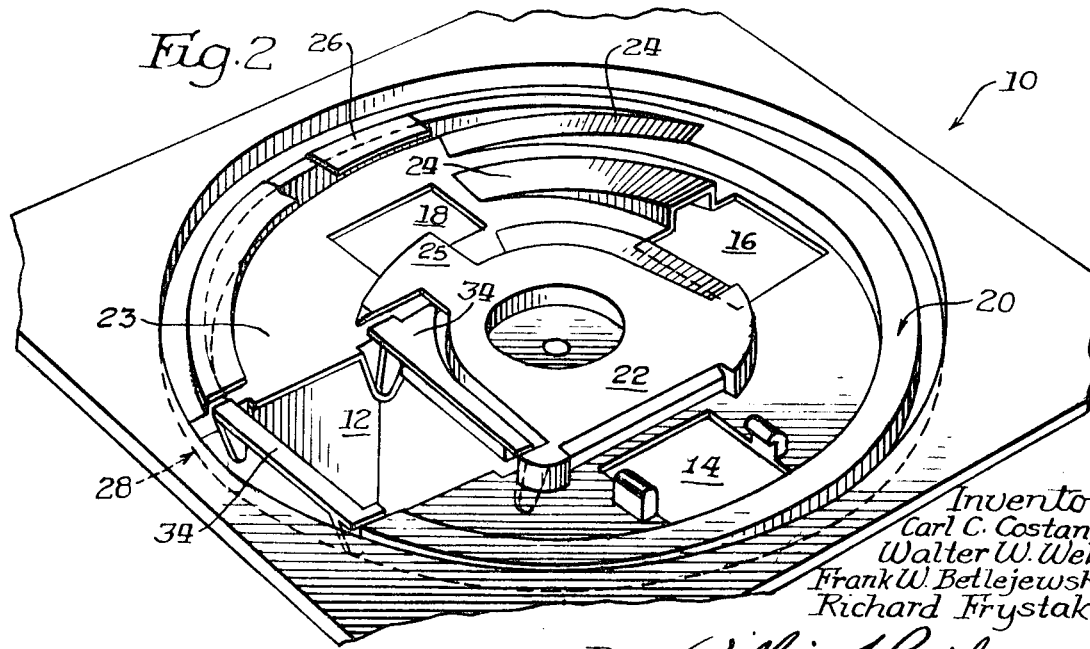
FIG. 2 is a perspective view of the platen which comprises the transport surfaces.

The retaining means 28 consists of two retaining arms 32 having a flat upper-surface 34 and a bevelled under-surface 37 positioned in sockets 36 to permit rotational movement thereof and a spring 30 which urges elements 32 towards one another. The spring 30 urges the arms 32 together to the point that a slide may be placed in contact with both upper surfaces 34. However, the retaining means must be constructed to allow sufficient separation of the retaining arms 32 to permit passage of a slide between them.

The pre-viewing aperture 14 located substantially 90° from the exit aperture permits the operator to view a slide prior to projection as more fully set out in co-pending application Ser. No. 735,750.

The projection aperture 16, positioned substantially 90° from the pre-viewing aperture, permits projection of a slide on a conventional viewing screen. As best seen in FIG. 6, a light source 52 underneath aperture 16, and a projection mirror and focusing lens shown generally, but not illustrated in detail, at 50 above the projection aperture 16 effect the projection of a slide placed over the projection aperture 16. A suitable mirror and focusing lens are described in co-pending application Ser. No. 860,858. Spill light from light source 52 illuminates apertures 14 and 18.

Post-projection viewing aperture 18 allows the operator to determine which slide has last been projected in a manner similar to that at the pre-viewing aperture 14.

The realization that the slides to be viewed are placed above the retaining device 28, and then sequentially are transported to the pre-viewing aperture 14, the projection aperture 16, the post-projection aperture 18, and finally through the exit aperture 12 will aid in the understanding of the following description.

The platen 10 has an annular outer raised portion 20, inner raised surface 22, inclined plane surfaces 24, a plate-like surface 25, holding plate surface 26 shown partly broken away, and a lower surface 23. The above described surfaces define the areas on which a slide travels from retaining means 28 to exit aperture 12.

Figure 4:
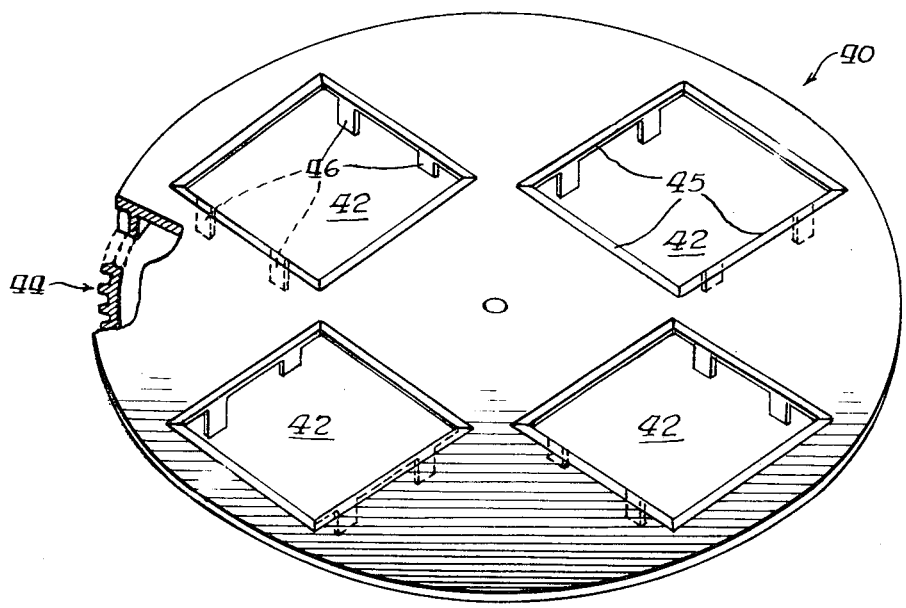
FIG. 4 is a perspective view of the drive plate which moves the slides through the projector.

FIG. 4 illustrates the drive plate 40 utilized to move slides along the transport surfaces 20, 22, 24, 23, 26. The drive plate 40 embodies a flat generally circular plate, four receiving apertures 42, pushing tabs 46 and gear teeth 44 which exist about the entire circumference.

As seen in FIG. 6, the drive plate 40 is rotatably fastened above the platen 10 by a conventional fastener 72. It should be pointed out that while FIG. 6 is taken along lines 6—6 of FIG. 1, FIG. 6 shows the apparatus in a more fully assembled condition than FIG. 1 for reasons of clarity. In FIG. 1 the drive plate 40 is partially illustrated and it can be seen that gear teeth 44 mesh with gears indicated generally at 8.

A motor, not shown, drives the gears 8 which in turn drive gear teeth 44 and the drive plate 40 is thusly rotated relative to base platen 10. The motor preferrabiy is adapted to be driven in forward and reverse directions, thus permitting bi-rotational movement of the drive plate 40.

The tabs 46 are spaced to correspond to the gaps between inclined plane areas 24 and at least one tab on each side of each receiving aperture 42 extends far enough to contact the edge of a transparency on the lower surface 23 of the platen 10.

The edges 45 of the receiving apertures 42 are bevelled to facilitate entry of a slide. The receiving apertures 42 are spaced substantially 90° from one another and coincide with the apertures 12, 14, 16, 18 in the platen 10 when they are in overlying relationship.

As best seen in FIG. 6, slides 60 are supplied to the transport apparatus from a supply cartridge 54 positioned over the upper surfaces 34 of retaining elements 32 by insertion into a housing 38 which overlies drive plate 40. The cartridge 54 is slid horizontally into position with its flanges 41 (FIG. 7) cooperating with grooves 39. The supply cartridge is more fully described in co-pending application Ser. No. 860,856.

Beneath the platen 10 and coincidental with the exit aperture 12, a receiving chamber 62 collects the slides 60 after projection. The shape of the supply cartridge 54 and the receiving chamber 62, as well as the shape of apertures 42, 12, 14, 16, 18 are slightly larger than and conform generally to the shape of the slides, in this case approximately square. However, it should be apparent that the shapes of the apertures are relatively immaterial so long as they permit entry of a slide and transferral of a slide from one to the other.

The device is ready for operation when the centers of slides 60 in the supply cartridge, an aperture 42 in the driving plate, the exit aperture 12 in the platen and the receiving chamber 62 are substantially coincidentally positioned. As seen in FIG. 6, a slide will be gravitationally urged against the upper surface 34 of retaining elements 32 within a receiving aperture 42 of the drive plate 40.

Activation of drive means 8 to produce 90° of counter-clockwise rotation (FIG. 1) of drive plate 40 causes a single slide to be urged by the tabs 46 and the edges 45 of the receiving aperture 42 along the surfaces 20, 22 of the platen until the center of the slide substantially coincides with the center of the pre-viewing aperture 14.

A metering device (not shown) may be added to ensure that only a single slide, regardless of thickness, will be carried by the receiving aperture 42.

A second 90° counter-clockwise rotation of the drive plate 40 causes the slide to move along surfaces 20, 22 to a point where its center is substantially coincident with that of projection aperture 16. FIG. 1 illustrates a slide 63 supported by surfaces 20, 22 and moved by tabs 46 at a point between the pre-viewing aperture 14 and the projecting aperture 16.

A third 90° counter-clockwise rotation of the drive plate 40 will force the slide down inclined plane surfaces 24, under the holding plate 26 and the plate-like portion 25 of the platen 10 and onto the lower surface 23 of the platen to a point where its center is substantially coincident with that of the post-projection viewing aperture 18. The slide 61 in FIG. 1 is illustrated as it travels down the inclined plane surfaces 24, note that the tabs 46 travel between the inclined plane surfaces 24.

Figure 3:
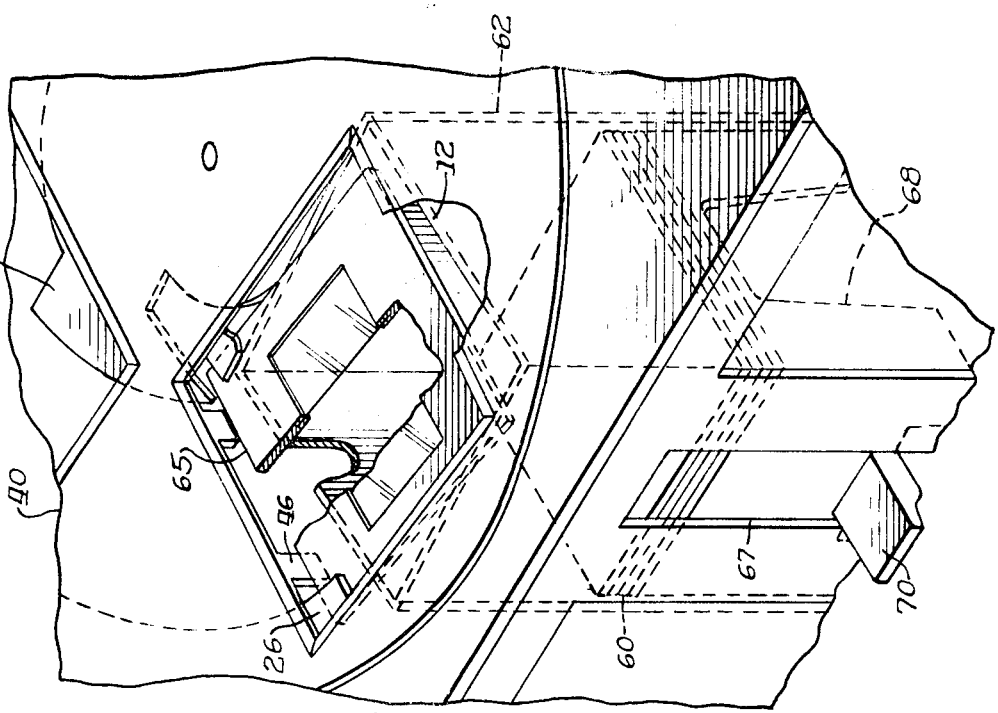
FIG. 3 is a perspective view of a slide beginning to fall through the exit aperture into the receiving chamber.

A fourth 90° counter-clockwise rotation of the drive plate 40 will cause one of the pusher tabs 46 to urge the slide along the lower surface 23 of the platen 10 under the retaining elements 32 until the slide drops into the receiving chamber 62 through the exit aperture 12. FIG. 3 shows a slide 65 about to fall into the receiving chamber. For reasons of clarity, illustration of the platen 10 and the retaining mechanism 28 has been partially omitted from FIG. 3.

Thus a slide enters the transport mechanism, completes a 360° path through the operative stations and is ejected from the transport mechanism.

It should be apparent that as the drive plate 40 is rotated through each 90° segment, a new slide will enter a receiving aperture 42 presented to the supply cartridge 54. Therefore the presentation of slides to the projection aperture 16 will be continuous until the slides 60 are exhausted from the supply cartridge 54.

An important feature of this invention is the capability to reverse the normal operating sequence and re-project a slide that has been projected and cycled to the post-projection viewing aperture 18.

The most frequent operating condition of the projector occurs after the drive plate 40 has been rotated counter-clockwise at least 360° and therefore all four receiving apertures 42 contain a slide coincident with the apertures 12, 14, 16, 18 of the base plate 10. Should it be desired to re-project the slide coincident with the post-projection aperture 18, the drive plate 40 need merely be rotated 90° in a clockwise direction. The slide formerly at the post-projection viewing aperture 18 will move up the inclined plane surfaces 24 to a position coincident with the projection aperture 16. The slide formerly at the projection aperture 16 will move along surfaces 20, 22 to a point coincident with the pre-viewing aperture 14. The slide formerly at the pre-viewing aperture 14 will move along surfaces 20, 22 and onto the upper surfaces 34 of the retaining elements 32 to a point coincident with the exit aperture 12. The slide formerly resting on the upper surface 34 of the retaining elements 32 will move along the holding plate surface 26 and the plate-like surface 25 to a point coincident with the post-projection viewing aperture 18, but above the lower surface 23 of the platen 10.

Because a second consecutive clockwise rotation would force the slide resting on surfaces 25, 26 to drop onto the inclined plane surface 24 and be transported to the projection aperture 16, the projection of a slide out of sequence from the order the slides 60 are put into the supply cartridge 54 would result.

To avoid non-sequential projection, it is necessary to limit reversal of the drive plate 40 to a single 90° clockwise rotation at any one time. A device for accomplishing that end is the subject of co-pending application Ser. No. 860,336.

Turning to FIG. 6, it is seen that a loading platform 68 and a spring 64 are contained within the receiving chamber 62. The loading platform 68 nestles slideably within the receiving chamber 62. The receiving chamber 62 defines a longitudinally extending orifice with substantially the same cross-sectional shape as that of the slides. The particular shape of the receiving chamber 62 is unimportant as long as it permits slides to enter freely and be positioned in a horizontal plane when their fall ceases. The loading platform 68 is free from the spring 64, the function of the spring 64 being merely to position the loading platform near the exit aperture 12 to reduce the distance a slide must fall to be supported by the platform.

As best illustrated in FIG. 3, a handle 70, attached to the loading platform 68, extends through a slot 67 in the receiving chamber 62. The handle 70 may be utilized to manually effect vertical movement of the loading platform 68.

After a given supply of slides has been exhausted and they are located in the receiving chamber 62, the slides must be ejected from the receiving chamber 62. The cooperation of the slidable loading platform 68 and the retaining means 28 rapidly accomplishes the desired ejectment.

Figure 7:
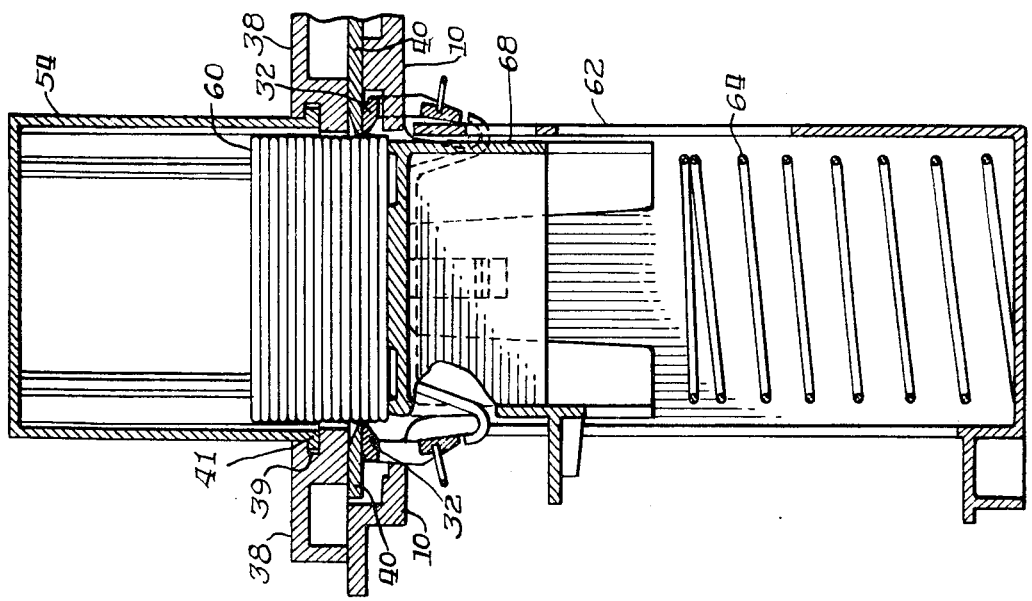
FIG. 7 is a portion of FIG. 6 in a different operative condition.
Figure 5:
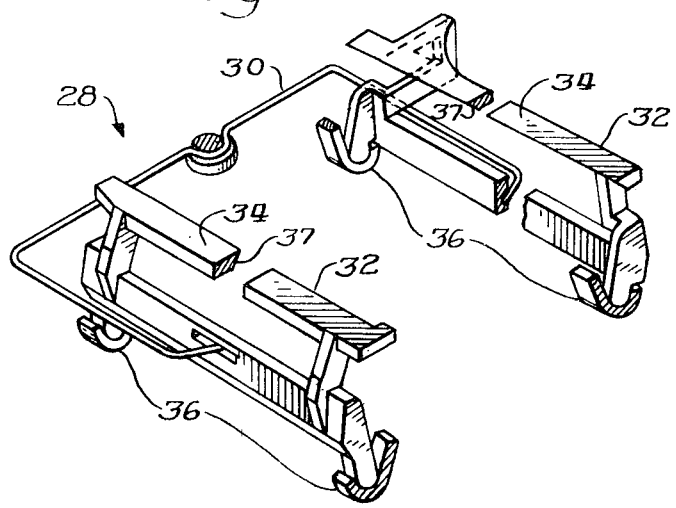
FIG. 5 is a perspective view of the retaining means.
Figure 9:
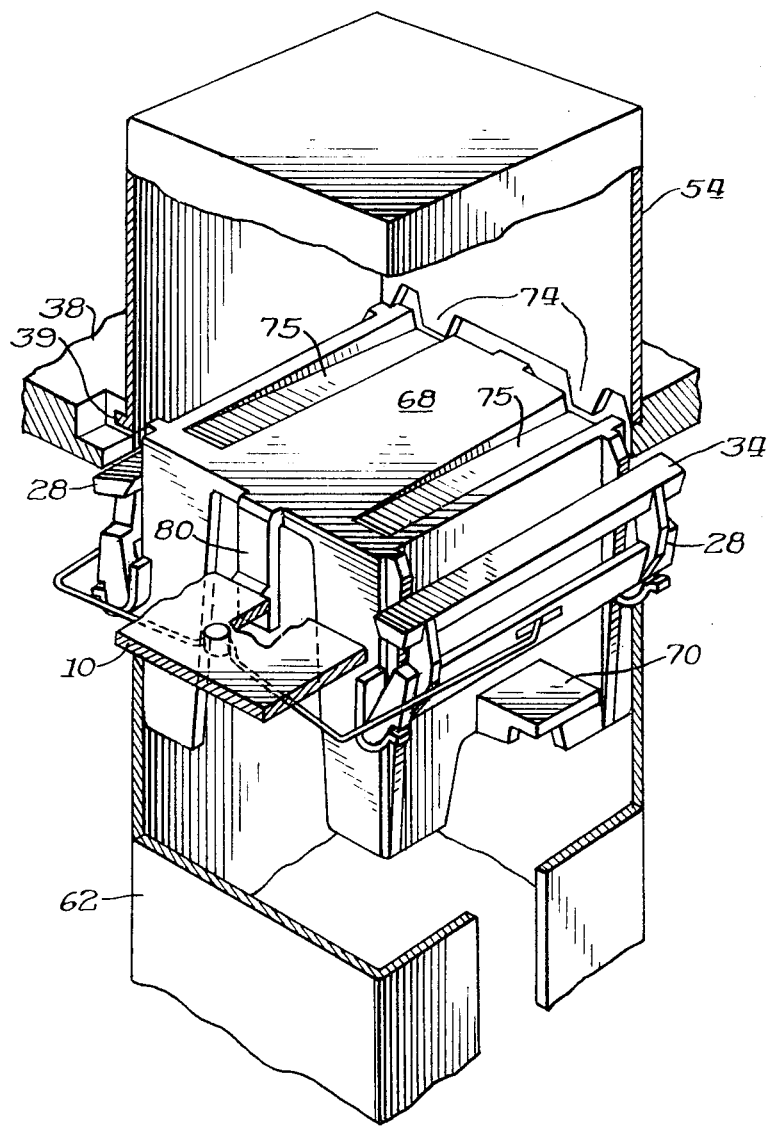
FIG. 9 is a perspective view of the slide ejection apparatus in its uppermost position.

Best understood by comparing FIGS. 6, 7 and 9, when the loading platform 68 is raised by the handle 70 to the slides are urged against the bevelled surface 37 (FIG. 5) of the retaining arms 32 causing them to spread apart and permit passage of the slides. FIG. 7 illustrates the ejection process near its completion. When the platform 68 reaches its uppermost position (FIG. 9) all of the slides are contained with the slide cartridge 54 and the cartridge may be removed by sliding in a leftwardly direction. A detent 80 maintains the platform in its uppermost position until the slides are moved far enough that support from the platform 68 is unnecessary. If the platform 68 were lowered before it ceased to support the slides, they would drop into engagement with the upper surface 34 of the retaining arms as shown by the upper group of slides in FIG. 6 and the lowermost slides would jam with the drive plate 40 and the housing 38 if the leftward sliding (FIG. 9) were continued.

Inclined plane surfaces 75, 75 on the upper surface of the platform 68 cooperate with tabs 74, 74 projecting from the upper edge of the cartridge 54 to release the platform from the detent 80 when the cartridge has been slid leftwardly enough to permit release of the platform 68. As the cartridge 54 slides leftwardly, the tabs 74, 74 exert an increasingly greater downward force on the platform until the detent 80 is forced beneath the upper surface of the platen 10. Whereupon the platform falls into the receiving chamber 62 and the entry-exit station will be able to accommodate another supply cartridge 54 when the first is removed.

It should be apparent that additional detents could be added if so desired. Furthermore although two tabs 74, 74 and associated grooves 75, 75 have been described only one set is absolutely necessary and of course, more could be added. It should again be noted that a suitable supply cartridge 54 has been made the subject of co-pending application Ser. No. 860,856.

Figure 8:
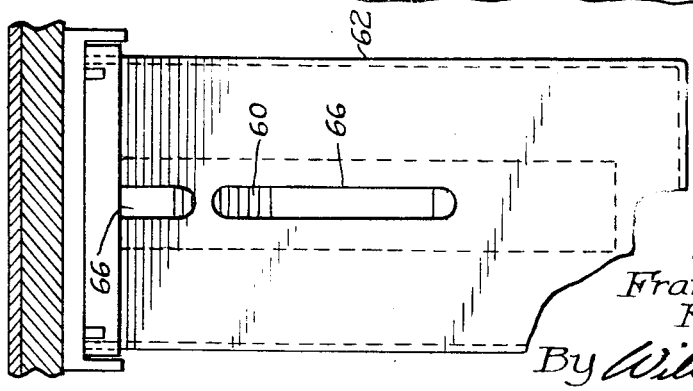
FIG. 8 is a view of one side of the receiving chamber.

Another feature of this invention is illustrated in FIG. 8. When slides are first received after processing they are not contained within a supply cartridge 54. To allow the photographer to view the new slides before putting them into a supply cartridge 54, means (not shown) are provided at the pre-viewing aperture 14 to allow insertion into the slide transport apparatus by hand.

It then becomes necessary to know how many slides have been cycled into the receiving chamber 62 so that no more than can easily be held by the supply cartridge 54 are placed therein.

To that end slots 66 have been cut into a wall of the receiving chamber. Spill light from the light source 52 illuminates the slots 66 and thus the level of the slides in the receiving chamber may easily be determined by appropriate markings or with reference to the top of the slot. Colored cellophane or the like may be placed over the slot 66 to reduce glare.

That the particular shape of the slide and thus the corresponding apertures could easily be changed from what has been described for illustration purposes should be apparent.

Furthermore, the deletion of the pre-viewing station and/or the post-projection station could easily be effected with corresponding modifications.

Also the addition of operative stations would not substantially affect the invention.

Thus apparatus which provides a convenient means for handling slides within a slide projector has been described. It should be obvious that many modifications and alterations of the embodiments above-described may be made without departing from the spirit and scope of the invention as set forth in the appended claims.

Having thus described the invention, what is claimed is:

1. A platen for receiving and supporting photographic slides comprising: means for receiving a supply of slides, an exit aperture larger than said slides disposed at a lower level in said platen and a projection aperture for permitting the passage of light, said apertures being disposed on a circular travel path for said slides; and transport surfaces on said platen for supporting a slide as it travels along said circular travel path from said receiving means to said exit apertures, said transport surfaces being at an upper level at said receiving means and being disposed along said circular travel path from said receiving means to said exit aperture at said lower level, said transport surfaces including portions thereof that gradually diminish in height between said upper and lower levels.

2. The platen set forth in claim 1 further comprising transport surfaces disposed at said level and communicating with said exit aperture for supporting slides as they are moved in a reverse direction along said circular path from said receiving means, said surfaces being plate-like and spaced above said lower level whereby slides may be transported thereunder.

3. The platen set forth in claim 2 further comprising a previewing aperture disposed on said circular path between said exit aperture and said projection aperture and wherein said previewing aperture is spaced substantially 90° from said exit and said projection apertures.

4. The platen set forth in claim 3 wherein said receiving means comprises retaining means disposed at said upper level over said exit aperture for supporting a stack of slides thereon.

* * * * *